United States Patent
Chen (10) Patent No.: US 9,997,949 B2
(45) Date of Patent: Jun. 12, 2018

(54) WIRELESS CHARGING DEVICE, ELECTRONIC APPARATUS AND INFORMATION PROCESSING METHOD

(71) Applicant: Lenovo (Beijing) Co., Ltd., Beijing (CN)

(72) Inventor: Xiaodong Chen, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 296 days.

(21) Appl. No.: 14/849,215

(22) Filed: Sep. 9, 2015

(65) Prior Publication Data

US 2016/0301237 A1 Oct. 13, 2016

(30) Foreign Application Priority Data

Apr. 13, 2015 (CN) .......................... 2015 1 0173975

(51) Int. Cl.
*H02J 7/00* (2006.01)
*H02J 7/02* (2016.01)
*H02J 7/04* (2006.01)
*H01F 38/14* (2006.01)
*H04B 5/00* (2006.01)
*H02J 50/10* (2016.01)

(52) U.S. Cl.
CPC .............. *H02J 7/025* (2013.01); *H01F 38/14* (2013.01); *H02J 7/042* (2013.01); *H02J 50/10* (2016.02); *H04B 5/0037* (2013.01)

(58) Field of Classification Search
CPC . H02J 7/025; H02J 50/10; H02J 7/042; H04B 5/0037; H01F 38/14
See application file for complete search history.

(56) References Cited

U.S. PATENT DOCUMENTS

| 9,507,447 | B2* | 11/2016 | Yilmaz | G06F 1/1635 |
| 9,590,700 | B2 | 3/2017 | Kato et al. | |
| 9,622,366 | B2* | 4/2017 | Lin | H05K 7/00 |
| 9,722,453 | B2 | 8/2017 | Wang | |
| 2010/0315389 | A1* | 12/2010 | Sorrell | H01Q 1/22 345/204 |
| 2011/0050164 | A1* | 3/2011 | Partovi | H01F 5/003 320/108 |

(Continued)

FOREIGN PATENT DOCUMENTS

| CN | 203088976 U | 7/2013 |
| CN | 103885599 A | 6/2014 |

(Continued)

OTHER PUBLICATIONS

Office Action regarding Chinese Patent Application No. 201510173975.9, dated Feb. 8, 2018. Translation provided by Unitalen Attorneys at Law.

*Primary Examiner* — Nha Nguyen
(74) *Attorney, Agent, or Firm* — Harness, Dickey & Pierce, P.L.C.

(57) ABSTRACT

A wireless charging device, an electronic apparatus and an information processing method are provided. The wireless charging device includes a charging coil and a touch panel on which the charging coil is arranged, where the touch panel includes a ground trace layer, and the charging coil is insulated from the ground trace layer. With the wireless charging device, the efficiency of wireless charging can be increased.

19 Claims, 4 Drawing Sheets

(56) References Cited

U.S. PATENT DOCUMENTS

| | | | | |
|---|---|---|---|---|
| 2012/0057322 A1* | 3/2012 | Waffenschmidt | ..... | H01F 27/365 361/816 |
| 2012/0119708 A1* | 5/2012 | Toya | ............... | H01F 38/14 320/137 |
| 2012/0243719 A1* | 9/2012 | Franklin | ............... | G06F 1/1652 381/333 |
| 2012/0309310 A1* | 12/2012 | Greuet | ............... | H04B 5/0031 455/41.1 |
| 2014/0132529 A1 | 5/2014 | Jeong | | |
| 2014/0335785 A1 | 11/2014 | Kato et al. | | |
| 2014/0375262 A1* | 12/2014 | Yamaguchi | ............. | H02J 7/025 320/108 |
| 2015/0145810 A1* | 5/2015 | Shih | ............... | G06F 3/0416 345/174 |
| 2015/0193080 A1* | 7/2015 | Takahashi | ............... | G06F 3/044 345/174 |
| 2016/0087482 A1 | 3/2016 | Wang | | |
| 2016/0179223 A1* | 6/2016 | Konanur | ............ | G06K 9/00087 345/179 |
| 2016/0181857 A1* | 6/2016 | Konanur | ................ | H01Q 7/00 320/108 |
| 2016/0306489 A1* | 10/2016 | Mizuhashi | ............ | G06F 3/0416 |
| 2016/0323428 A1* | 11/2016 | Kim | ............... | G06F 1/1658 |
| 2017/0005399 A1* | 1/2017 | Ito | ............... | H01Q 7/06 |
| 2017/0133743 A1 | 5/2017 | Kato et al. | | |
| 2017/0139525 A1* | 5/2017 | Jo | ............... | G06F 3/0412 |
| 2017/0148750 A1* | 5/2017 | Saraswat | ............... | H01L 23/645 |
| 2017/0177122 A1* | 6/2017 | Jiang | ............... | G06F 3/046 |

FOREIGN PATENT DOCUMENTS

| | | |
|---|---|---|
| CN | 104094468 A | 10/2014 |
| CN | 104199576 A | 12/2014 |
| CN | 203982340 U | 12/2014 |

* cited by examiner

WIRELESS CHARGING DEVICE, ELECTRONIC APPARATUS AND INFORMATION PROCESSING METHOD

CROSS REFERENCE TO RELATED APPLICATIONS

The present application claims the priority of Chinese Patent Application No. 201510173975.9, entitled "WIRELESS CHARGING DEVICE, ELECTRONIC APPARATUS AND INFORMATION PROCESSING METHOD", filed on Apr. 13, 2015 with the State Intellectual Property Office of People's Republic of China, the content of which is incorporated herein by reference.

FIELD

The present disclosure relates to the technical field of wireless charging, and more particularly, to a wireless charging device, an electronic apparatus and an information processing method.

BACKGROUND

With the increasing development of electronic industry, the electronic apparatus with a wireless charging function is increasingly preferred by users.

For the electronic apparatus with the wireless charging function, the position of a charging coil in the electronic apparatus is an important design point. To ensure the size of the charging coil, the charging coil is generally arranged at a position on the front side or the back side of the body of the electronic apparatus. Taking a notebook computer for example, the charging coil is generally arranged at the palm rest position on one side of the body provided with a keyboard.

However, since the body of the electronic apparatus, such as the palm rest region of the notebook computer, is generally made of metallic materials or plastic materials and metallic materials, and a situation that an electrical conductor such as a metal is grounded may occur during the transmission of a magnetic signal emitted by the charging coil, thereby reducing the efficiency of wireless charging.

SUMMARY

In view of this, the disclosure provides a wireless charging device, an electronic apparatus and an information processing method, so as to solve the technical problem in the conventional technology that a situation that an electrical conductor such as a metal is grounded may occur during the transmission of the magnetic signal emitted by the charging coil, and thus the efficiency of wireless charging is reduced.

In order to achieve the above object, the disclosure provides the following technical solutions.

A wireless charging device includes a charging coil and a touch panel on which the charging coil is arranged, where the touch panel includes a ground trace layer, and the charging coil is insulated from the ground trace layer.

An electronic apparatus includes a wireless charging device.

The wireless charging device includes a charging coil and a touch panel on which the charging coil is arranged, where the touch panel includes a ground trace layer, and the charging coil is insulated from the ground trace layer.

An information processing method applied to any one of the electronic apparatuses described above is provided, the electronic apparatus further includes a sensing device; and the method includes:

determining, with the sensing device, whether there is an object approaching the touch panel;

determining attributes of the object approaching the touch panel with characteristic parameters collected by the sensing device in a case that it is determined that there is the object approaching the touch panel;

controlling the wireless charging device to be turned off and maintaining a touch recognition function of the touch panel in a case that it is determined that the object is a human object; and controlling the touch recognition function of the touch panel to be disabled and maintaining a wireless charging function of the wireless charging device in a case that it is determined that the object is a non-human object.

DETAILED DESCRIPTION

Technical solution according to embodiments of the disclosure are described clearly and completely in conjunction with the drawings hereinafter. It is apparent that the described embodiments are only a few rather than all of the embodiments of the disclosure. All other embodiments obtained by those skilled in the art based on the embodiments of the disclosure without any creative work fall into the protective scope of the disclosure.

Figure 1:
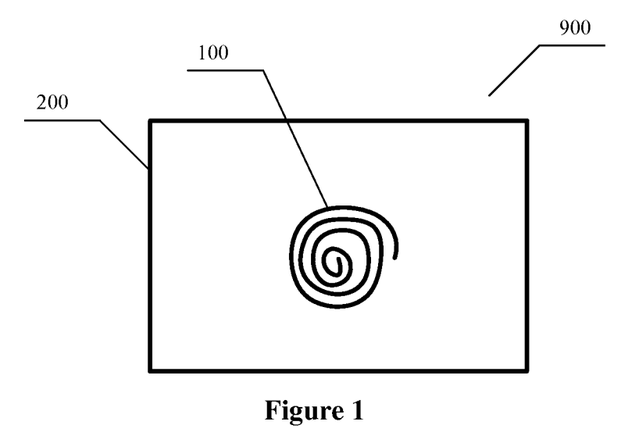
FIG. 1 is a schematic structural diagram of a wireless charging device according to an embodiment of the disclosure.

An embodiment of the disclosure provides a wireless charging device. Referring to FIG. 1, the wireless charging device 900 includes a charging coil 100 and a touch panel 200.

In this embodiment, the charging coil 100 has an annular swirling coil structure.

It is to be noted that the number and structure of the charging coils are not limited in this disclosure; and the charging coil 100 may be multiple coils, a square coil, or a triangle coil in other embodiments. Therefore, other embodiments including any number and structure of the charging coils fall into the protective scope of the disclosure.

The touch panel 200 includes a ground trace layer, and the charging coil 100 is insulated from the ground trace layer.

In this embodiment, since the charging coil is insulated from the ground trace layer, a magnetic signal emitted by the charging coil may not be directly shielded during the transmission of the magnetic signal, and thus the magnetic signal can pass through the ground trace layer, thereby increasing the efficiency of wireless charging.

According to this disclosure, the ground trace layer is laid with the traces which are staggered with respect to each other and are spaced apart to form multiple hollow regions. In practical applications, the magnetic signal emitted by the charging coil can pass through the hollow regions.

Figure 2:
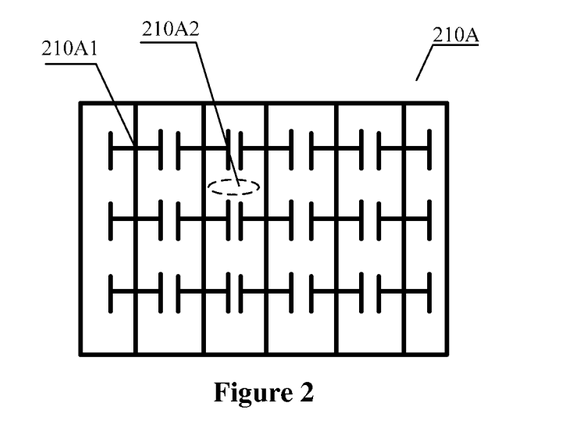
FIG. 2 is a schematic structural diagram of a ground trace layer according to an embodiment of the disclosure.

A specific structure of the ground trace layer is shown in FIG. 2. As shown in FIG. 2, the ground trace layer 210A is laid with H-shaped traces 210A1 among which multiple hollow regions are formed, such as hollow regions 210A2.

It is to be noted that the specific structure of the ground trace layer 210A is not limited in this disclosure; and the ground trace layer 210A may be laid with L-shaped or other shaped traces among which multiple hollow regions are formed in other embodiments. Therefore, other embodiments including any structure of the ground trace layer fall into the protective scope of the disclosure.

Figure 3:
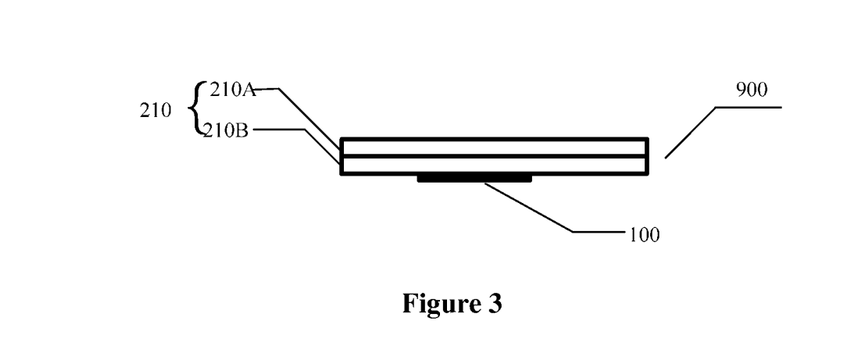
FIG. 3 is a schematic structural diagram of a wireless charging device according to an embodiment of the disclosure.

An embodiment of the disclosure provides a wireless charging device, as shown in FIG. 3, the wireless charging device 900 includes a charging coil 100 and a touch panel 200 on which the charging coil 100 is arranged.

The touch panel includes a ground component 210 including a ground trace layer 210A and a ground carrier layer 210B.

The ground carrier layer 210B is arranged between the charging coil 100 and the ground trace layer 210A.

The ground carrier layer 210B is made of insulating materials, so that the charging coil 100 is insulated from the ground trace layer 210A.

In this embodiment, the ground component 210 includes only one layer of the ground carrier layer 210B, but it is to be noted that the number of the ground carrier layers is not limited in this disclosure. The ground component 210 may also include multiple layers of the ground carrier layer 210B such as two or three layers in another embodiment.

Figure 4:
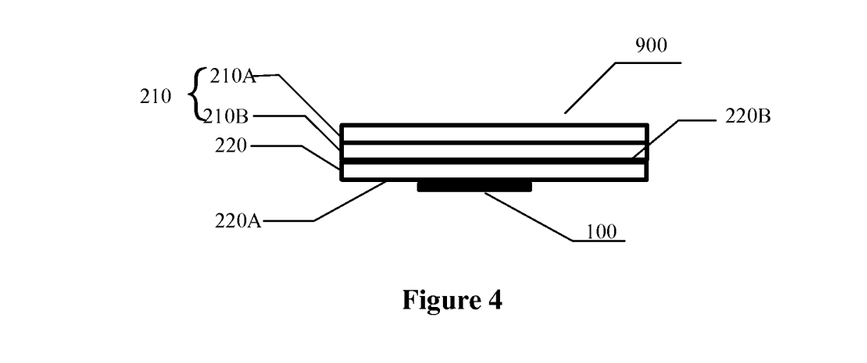
FIG. 4 is a schematic structural diagram of a wireless charging device according to an embodiment of the disclosure.

An embodiment of the disclosure provides a wireless charging device, as shown in FIG. 4, the wireless charging device 900 includes a charging coil 100 and a touch panel 200 on which the charging coil 100 is arranged.

The touch panel includes a ground component 210 and a non-touch component 220.

The ground component 210 includes a ground trace layer 210A and a ground carrier layer 210B; and the ground carrier layer 210B is made of insulating materials and is arranged between the ground coil 100 and the ground trace layer 210A.

The non-touch component 220 is configured to carry the charging coil 100. In this embodiment, the ground carrier layer 210B and the non-touch component 220 are arranged between the charging coil 100 and the ground trace layer 210A, that is, the charging coil 100 is arranged on a first surface 220A of the non-touch component 220, and the first surface 220A is a surface of the non-touch component 220 which is not adjacent to the ground component 210.

As a matter of course, in another embodiment, the charging coil 100 may be arranged on a second surface 220B of the non-touch component 220, and the second surface 220B is a surface of the non-touch component 220 which is adjacent to the ground component 210. It is to be noted that a positional relationship between the charging coil 100 and the non-touch component 220 is not limited in this disclosure.

Figure 5:
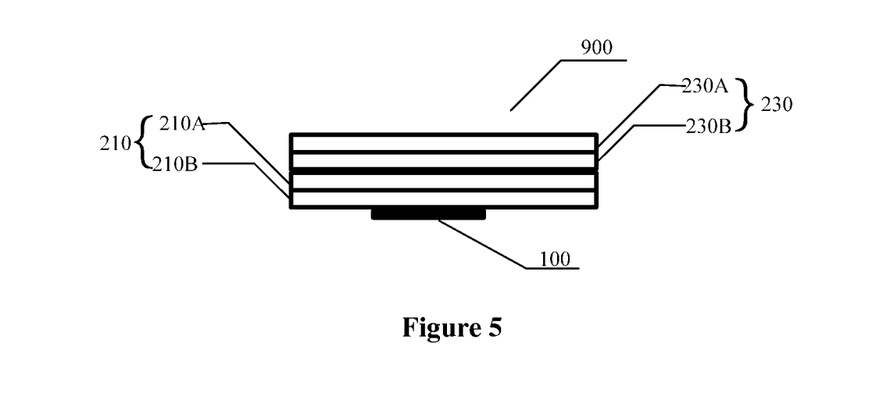
FIG. 5 is a schematic structural diagram of a wireless charging device according to an embodiment of the disclosure.

In order to achieve a wireless charging function of a wireless charging device with a touch panel and achieve a touch function of the touch panel, an embodiment of the disclosure provides a wireless charging device, as shown in FIG. 5, the wireless charging device 900 includes a charging coil 100 and a touch panel 200 on which the charging coil 100 is arranged.

The touch panel includes a ground component 210 and a touch component 230.

The ground component 210 includes a ground trace layer 210A and a ground carrier layer 210B.

The ground carrier layer 210B is made of insulating materials and is arranged between the charging coil 100 and the ground trace layer 210A.

The touch component 230 includes a sensing trace layer 230A and a sensing carrier layer 230B.

The sensing carrier layer 230B is made of insulating materials and is arranged between the sensing trace layer 230A and the ground trace layer 210A.

According to this disclosure, the touch component 230 can generate a sensing signal in response to a touch operation.

It is to be noted that traces in the sensing trace layer are arranged corresponding to traces in the ground trace layer, in order to ensure that the ground component provides a basic electric potential for the sensing trace layer of the touch component. In order to minimize the interference of the ground trace layer on the magnetic signal emitted by the charging coil, a layout of the traces in the ground trace layer may be the same as a layout of the traces in the sensing trace layer in this embodiment.

For example, H-shaped traces are arranged in the sensing trace layer, correspondingly, H-shaped traces are also arranged in the ground trace layer, and a position where the ground trace layer is mapped onto the ground carrier layer corresponds to a position where the sensing trace layer is mapped onto the sensing carrier layer.

As a matter of course, the traces in the sensing trace layer are not limited to the H-shaped traces, the traces in the sensing trace layer may be L-shaped traces, and L-shaped traces are also arranged in the ground trace layer correspondingly in another embodiment. The traces in the sensing trace layer may be arranged according to practical situations, which are not limited in this disclosure.

According to this disclosure, since the layout of the traces in the sensing trace layer is the same as the layout of the traces in the ground trace layer, not only it is ensured that the ground trace layer provides the basis electric potential for the sensing trace layer, but also the shielding of a conductive material against the magnetic signal is minimized and thus the efficiency of charging is increased.

It is to be noted that the touch panel may further include a touch component besides a ground trace layer in another embodiment, and the sensing carrier layer is arranged between the ground trace layer and the sensing trace layer. Alternatively, the touch panel may include a touch component, a non-touch component and a ground component, any the positional relationships among the components and the positional relationships between the components and the charging coil may refer to the embodiments corresponding to FIG. 4 and FIG. 5, which are not described any more herein.

According to this disclosure, for ease of a touch operation of a user, the touch panel may further include a protective layer arranged on the surface of the sensing trace layer 230A, which may be touched directly by the user. When the user performs the touch operation on the protective layer, the touch component may sense the touch operation and generate a sensing signal.

In practical applications, the ground trace layer may be coupled with the magnetic signal emitted by the charging coil, and thus the touch panel generates heat, which affects the sensitivity of the touch panel. In view of this case, an embodiment of the disclosure provides a wireless charging device. The wireless charging device includes a charging coil, a touch panel on which the charging coil is arranged, and a first energy storing and releasing device.

The specific structure of the touch panel and the positional relationship between the touch panel and the charging coil may refer to the above-described embodiments, which are not described any more herein.

Figure 6:
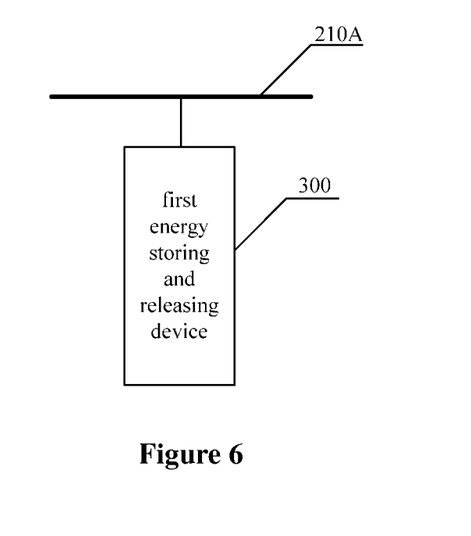
FIG. 6 is a schematic structural diagram of a part of a wireless charging device according to an embodiment of the disclosure.

Referring to FIG. 6, the first energy storing and releasing device 300 is connected to the ground trace layer 210A, and may be configured to collect energy which is generated by coupling the magnetic signal emitted by the charging coil onto the ground trace layer and release the energy in a case that the preset condition is met.

The preset condition may be set according to the practical situation, which is not limited in this disclosure. For example, the preset condition may be that it is detected that the touch panel does not sense the touch operation.

It is to be noted that the position of the first energy storing and releasing device is not limited in this disclosure. For example, the first energy storing and releasing device may be arranged at a position in the electronic apparatus where heat is readily dissipated.

In this embodiment, the first energy storing and releasing device connected to the ground trace layer is provided, and the energy which is generated by coupling the magnetic signal emitted by the charging coil onto the ground trace layer is collected by the first energy storing and releasing device. Therefore, the touch panel is prevented from generating heat and the normal operation of the touch panel is ensured.

In practical applications, in addition to the ground trace layer, the sensing trace layer may also be coupled with the magnetic signal emitted by the charging coil, and thus the touch panel generates heat, which affects the sensitivity of the touch panel. In view of this case, an embodiment of the disclosure provides a wireless charging device. The wireless charging device includes a charging coil, a touch panel on which the charging coil is arranged, and a second energy storing and releasing device.

The touch panel includes a touch component and a ground component. As a matter of course, the touch panel may further include a non-touch component.

The positional relationships among the components and the positional relationship between the touch panel and the charging coil may refer to the above-described embodiments, which are not described any more herein.

Figure 7:
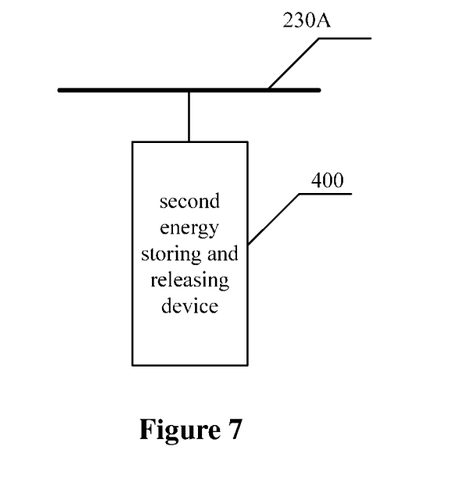
FIG. 7 is a schematic structural diagram of a part of a wireless charging device according to an embodiment of the disclosure.

Referring to FIG. 7, the second energy storing and releasing device 400 is connected to the sensing trace layer 230A, and may be configured to collect energy which is generated by coupling the magnetic signal emitted by the charging coil onto the sensing trace layer and release the energy in a case that the preset condition is met.

The preset condition may be set according to the practical situation, which is not limited in this disclosure. For example, the preset condition may be that it is detected that the touch panel does not sense the touch operation. It is to be noted that the preset condition may be a same preset condition as that in the above-described embodiment, or may also be a different preset condition from that in the above-described embodiments.

It is to be noted that the position of the second energy storing and releasing device is not limited in this disclosure. For example, the second energy storing and releasing device may be arranged at a position in the electronic apparatus where heat is readily dissipated.

In this embodiment, the second energy storing and releasing device connected to the sensing trace layer is provided, and the energy which is generated by coupling the magnetic signal emitted by the charging coil onto the sensing trace layer is collected by the second energy storing and releasing device. Therefore, the touch panel is prevented from generating heat and the normal operation of the touch panel is ensured.

It is to be noted that the wireless charging device may include both the first energy storing and releasing device connected to the ground trace layer and the second energy storing and releasing device connected to the sensing trace layer according to this disclosure.

The first energy storing and releasing device and the second energy storing and releasing device may be the same, or may also be different.

Figure 8:
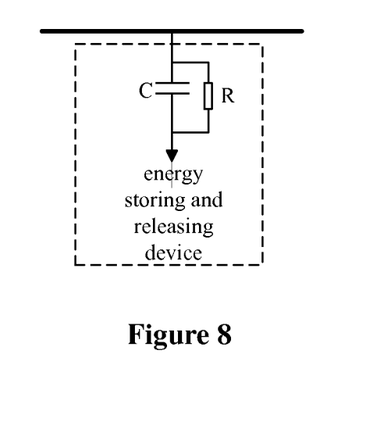
FIG. 8 is a schematic structural diagram of an energy storing and releasing device according to an embodiment of the disclosure.

The implementations of the first energy storing and releasing device and the second energy storing and releasing device are not limited in this disclosure, and the existing energy storing and releasing devices may be used. A specific implementation is described in FIG. 8, where the energy storing and releasing device at least includes a capacitor C connected to the ground trace layer or the sensing trace layer, and a resistor R connected in parallel across the capacitor C; the energy may be stored via the capacitor C and may be released via the resistor R.

An embodiment of the disclosure provides an electronic apparatus, and the electronic apparatus includes a wireless charging device including a charging coil and a touch panel on which the charging coil is arranged.

The touch panel includes a ground trace layer. The charging coil is insulated from the ground trace layer.

In this embodiment, since the charging coil is insulated from the ground trace layer, a magnetic signal emitted by the charging coil may not be shielded during the transmission of the magnetic signal, and thus the magnetic signal can pass through the ground trace layer, thereby increasing the efficiency of wireless charging.

According to this disclosure, the ground trace layer is laid with the traces which are staggered with respect to each other and are spaced apart to form multiple hollow regions. As a specific implementation, the ground trace layer is laid with H-shaped traces among which multiple hollow regions are formed.

An embodiment of the disclosure provides an electronic apparatus. The electronic apparatus includes a wireless charging device including a charging coil and a touch panel.

The touch panel includes a ground component including a ground carrier layer and a ground trace layer.

The ground trace layer is insulated from the charging coil, and the ground carrier layer is made of insulating materials and is arranged between the charging coil and the ground trace layer.

In an embodiment of the disclosure, the touch panel further includes a non-touch component for carrying the charging coil.

An embodiment of the disclosure provides an electronic apparatus, and the embodiment differs from the above-described embodiment in that the touch panel further includes a touch component, the touch component includes a sensing carrier layer and a sensing trace layer; and the sensing carrier layer is made of insulating materials and is arranged between the sensing trace layer and the ground trace layer.

In practical applications, the ground trace layer may be coupled with the magnetic signal emitted by the charging coil, and thus the touch panel generates heat, which affects the sensitivity of the touch panel. In view of this case, an embodiment of the disclosure provides an electronic apparatus including a wireless charging device. The wireless charging device includes a charging coil, a touch panel on which the charging coil is arranged, and a first energy storing and releasing device.

The specific structure of the touch panel and the positional relationship between the touch panel and the charging coil may refer to the above-described embodiments, which are not described any more herein.

The first energy storing and releasing device is connected to the ground trace layer, and may be configured to collect energy which is generated by coupling the magnetic signal emitted by the charging coil onto the ground trace layer and release the energy in a case that the preset condition is met.

In this embodiment, the first energy storing and releasing device connected to the ground trace layer is provided, and the energy which is generated by coupling the magnetic signal emitted by the charging coil onto the ground trace layer is collected by the first energy storing and releasing device. Therefore, the touch panel is prevented from generating heat and the normal operation of the touch panel is ensured.

In practical applications, in addition to the ground trace layer, the sensing trace layer may also be coupled with the magnetic signal emitted by the charging coil, and thus the touch panel generates heat, which affects the sensitivity of the touch panel. In view of this case, an embodiment of the disclosure provides an electronic apparatus including a wireless charging device. The wireless charging device includes a charging coil, a touch panel on which the charging coil is arranged, and a second energy storing and releasing device.

The touch panel includes a touch component and a ground component. As a matter of course, the touch panel may further include a non-touch component.

The positional relationships among the components and the positional relationship between the touch panel and the charging coil may refer to the above-described embodiments, which are not described any more herein.

The second energy storing and releasing device is connected to the sensing trace layer, and may be configured to collect energy which is generated by coupling the magnetic signal emitted by the charging coil onto the sensing trace layer and release the energy in a case that the preset condition is met.

In this embodiment, the second energy storing and releasing device connected to the sensing trace layer is provided, and the energy which is generated by coupling the magnetic signal emitted by the charging coil onto the sensing trace layer is collected by the second energy storing and releasing device. Therefore, the touch panel is prevented from generating heat and the normal operation of the touch panel is ensured.

An embodiment of the disclosure provides an information processing method. The method may be applied to an electronic apparatus, and the specific structure of the electronic apparatus may refer to the above-described embodiments.

The electronic apparatus further includes a sensing device.

Figure 9:
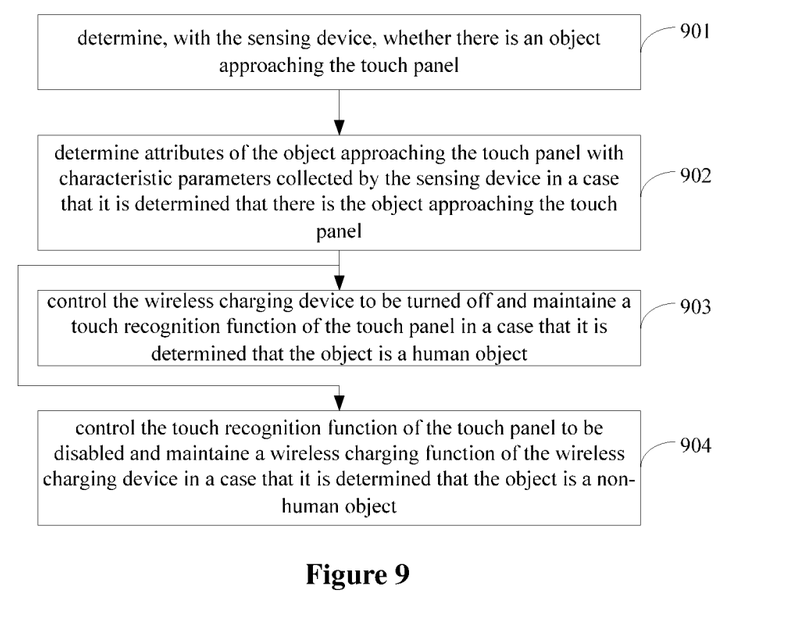
FIG. 9 is a schematic flow chart of an information processing method according to an embodiment of the disclosure.

As shown in FIG. 9, the method may include the following steps 901 to 904.

In step 901, it is determined whether there is an object approaching the touch panel using a sensing device.

The sensing device may be configured to detect whether there is the object approaching the touch panel, and the sensing device may be composed of sensing signal lines on the touch panel. As a matter of course, the sensing device may be implemented with other devices such as a sensor.

In a case that it is determined that there is no object approaching the touch panel, one or both of the wireless charging function of the wireless charging device and the touch recognition function of the touch panel may be maintained, or both of the wireless charging function of the wireless charging device and the touch recognition function of the touch panel may be disabled, which may be set according to the practical situation and is not limited in this disclosure.

In step 902, attributes of the object approaching the touch panel are determined with characteristic parameters collected by the sensing device in a case that it is determined that there is the object approaching the touch panel.

The attributes of the object approaching the touch panel may be determined with the characteristic parameters collected by the sensing device, and thus it is determined that the touch recognition function of the touch panel or the wireless charging function of the charging coil arranged on the touch panel is needed to be used.

Specifically, the characteristic parameters for distinguishing the attributes of the different objects may be pre-stored in the electronic apparatus; the attributes of the object approaching the touch panel are determined by comparing the characteristic parameters collected by the sensing device with the pre-stored characteristic parameters.

In step 903, the wireless charging device is controlled to be turned off and the touch recognition function of the touch panel is maintained in a case that it is determined that the object is a human object.

It may be determined that a user needs to use the touch recognition function of the touch panel of the electronic apparatus in the case that it is determined that the object is the human object. In this case, the wireless charging device may be controlled to be turned off and the touch recognition function of the touch panel may be maintained, thereby ensuring that the electronic apparatus can recognize the touch operation of an operator.

In step 904, the touch recognition function of the touch panel is controlled to be disabled and the wireless charging function of the wireless charging device is maintained in a case that it is determined that the object is a non-human object.

It may be determined that the user needs to use the wireless charging function of the electronic apparatus in the case that it is determined that the object is the non-human object such as an electronic object. In this case, the touch recognition function of the touch panel may be controlled to be disabled and the wireless charging function of the wireless charging device may be maintained, thereby ensuring that the electronic apparatus can be charged with the wireless charging device.

In this embodiment, since the charging coil is insulated from the ground trace layer, the magnetic signal emitted by the charging coil may not be directly shielded during the transmission of the magnetic signal, and thus the magnetic signal can pass through the ground trace layer, thereby increasing the efficiency of wireless charging.

Furthermore, with the information processing method according to this embodiment, it can be determined that the user needs to use the touch recognition function of the touch panel of the electronic apparatus or the wireless charging function of the wireless charging device of the electronic apparatus according to the attributes of the object approaching the touch panel, thereby improving the convenience of operation without manual control.

Various embodiments in the specification are described in a progressive manner, the differences from other embodiments are emphatically illustrated in each embodiment, and reference can be made to other embodiments for understanding the same or similar parts of the embodiments.

The above description of the disclosed embodiments can enable those skilled in the art to practice or use the present disclosure. Multiple modifications to these embodiments are apparent for those skilled in the art, and the general principles defined herein may be implemented in other embodiments without departing from the spirit or scope of the disclosure. Hence, the present disclosure is not limited to these embodiments disclosed herein but is to conform to the widest scope consistent with the principles and novel features disclosed herein.

What is claimed is:

1. A wireless charging device, comprising:
   a charging coil and a touch panel on which the charging coil is arranged, and
   a first energy storing and releasing device;
   wherein the touch panel comprises a ground trace layer, and the charging coil is insulated from the ground trace layer;
   wherein the first energy storing and releasing device is connected to the ground trace layer; and
   wherein the first energy storing and releasing device is configured to collect energy which is generated by coupling a magnetic signal emitted by the charging coil onto the ground trace layer and release the energy in a case that a preset condition is met.

2. The device according to claim 1, wherein the ground trace layer is laid with traces which are staggered with respect to each other and are spaced apart to form a plurality of hollow regions.

3. The device according to claim 2, wherein the ground trace layer is laid with H-shaped traces among which the plurality of hollow regions are formed.

4. The device according to claim 1, wherein the touch panel comprises a ground component comprising a ground carrier layer and a ground trace layer, wherein the ground carrier layer is made of insulating materials and is arranged between the charging coil and the ground trace layer.

5. The device according to claim 1, wherein the touch panel further comprises a non-touch component for carrying the charging coil.

6. The device according to claim 1, wherein the touch panel further comprises a touch component comprising a sensing carrier layer and a sensing trace layer, wherein the sensing carrier layer is made of insulating materials and is arranged between the sensing trace layer and the ground trace layer.

7. The device according to claim 6, wherein each of traces in the sensing trace layer has a same shape as each of traces in the ground trace layer.

8. The device according to claim 6, wherein the wireless charging device further comprises:
   a second energy storing and releasing device connected to the sensing trace layer, wherein the second energy storing and releasing device is configured to collect energy which is generated by coupling the magnetic signal emitted by the charging coil onto the sensing trace layer and release the energy in the case that the preset condition is met.

9. The device according to claim 1, wherein the first energy storing and releasing device is arranged at a position where heat is readily dissipated.

10. The device according to claim 1, wherein the first energy storing and releasing device comprises a capacitor connected to the ground trace layer, and a resistor connected across two terminals of the capacitor.

11. An electronic apparatus, comprising a wireless charging device,
    the wireless charging device comprising a charging coil and a touch panel on which the charging coil is arranged, and a first energy storing and releasing device;
    wherein the touch panel comprises a ground trace layer, and the charging coil is insulated from the ground trace layer;
    wherein the first energy storing and releasing device is connected to the ground trace layer; and
    wherein the first energy storing and releasing device is configured to collect energy which is generated by coupling a magnetic signal emitted by the charging coil onto the ground trace layer and release the energy in a case that a preset condition is met.

12. The electronic apparatus according to claim 11, wherein the ground trace layer is laid with traces which are staggered with respect to each other and are spaced apart to form a plurality of hollow regions.

13. The electronic apparatus according to claim 12, wherein the ground trace layer is laid with H-shaped traces among which the plurality of hollow regions are formed.

14. The electronic apparatus according to claim 11, wherein the touch panel comprises a ground component comprising a ground carrier layer and a ground trace layer, wherein the ground carrier layer is made of insulating materials and is arranged between the charging coil and the ground trace layer.

15. The electronic apparatus according to claim 11, wherein the touch panel further comprises a non-touch component for carrying the charging coil.

16. The electronic apparatus according to claim 11, wherein the touch panel further comprises a touch component comprising a sensing carrier layer and a sensing trace layer, wherein the sensing carrier layer is made of insulating materials and is arranged between the sensing trace layer and the ground trace layer.

17. The electronic apparatus according to claim 16, wherein each of traces in the sensing trace layer has a same shape as each of traces in the ground trace layer.

18. The electronic apparatus according to claim 16, wherein the wireless charging device further comprises:
    a second energy storing and releasing device connected to the sensing trace layer, wherein the second energy storing and releasing device is configured to collect energy which is generated by coupling the magnetic signal emitted by the charging coil onto the sensing trace layer and release the energy in the case that the preset condition is met.

19. An information processing method applied to an electronic apparatus, the electronic apparatus comprising a wireless charging device, the wireless charging device comprising a charging coil and a touch panel on which the charging coil is arranged, wherein the touch panel comprises a ground trace layer, and the charging coil is insulated from the ground trace layer; the electronic apparatus further comprising a sensing device; and the method comprising:
   determining, with the sensing device, whether there is an object approaching the touch panel;
   determining attributes of the object approaching the touch panel with characteristic parameters collected by the sensing device in a case that it is determined that there is the object approaching the touch panel;
   controlling the wireless charging device to be turned off and maintaining a touch recognition function of the touch panel in a case that it is determined that the object is a human object; and
   controlling the touch recognition function of the touch panel to be disabled and maintaining a wireless charging function of the wireless charging device in a case that it is determined that the object is a non-human object.

* * * * *